United States Patent
Yoshinaga et al.

(10) Patent No.: US 7,665,101 B2
(45) Date of Patent: Feb. 16, 2010

(54) OPTICAL PICKUP APPARATUS

(75) Inventors: Chikashi Yoshinaga, Gunma (JP);
Kenichi Takeuchi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 504 days.

(21) Appl. No.: 11/424,786

(22) Filed: Jun. 16, 2006

(65) Prior Publication Data

US 2006/0285474 A1    Dec. 21, 2006

(30) Foreign Application Priority Data

Jun. 20, 2005    (JP) ............................... 2005-179041
Jun. 12, 2006    (JP) ............................... 2006-162175

(51) Int. Cl.
*G11B 7/22*    (2006.01)
*G11B 7/08*    (2006.01)

(52) U.S. Cl. ................... 720/658; 369/120; 369/112.01

(58) Field of Classification Search ................. 720/658, 720/689; 369/120, 112.01
See application file for complete search history.

(56) References Cited

U.S. PATENT DOCUMENTS

| 6,865,743 B2 * | 3/2005 | Nakata et al. ............... 720/689 |
| 7,257,828 B2 * | 8/2007 | Ito .............................. 720/658 |
| 2004/0141452 A1 * | 7/2004 | Ito .............................. 369/120 |

FOREIGN PATENT DOCUMENTS

| JP | 01278755 A | * | 11/1989 |
| JP | 03230328 A | * | 10/1991 |
| JP | 2000260788 A | * | 9/2000 |
| JP | 2002-251776 | | 9/2002 |
| JP | 2002368234 A | * | 12/2002 |

* cited by examiner

Primary Examiner—William J Klimowicz
(74) Attorney, Agent, or Firm—Fish & Richardson P.C.

(57) ABSTRACT

An optical pickup apparatus comprises a photo detector that receives light reflected from a medium; and a housing that is mounted with the photo detector. The photo detector is fixed to the housing with the use of an adhesive to mount the photo detector on the housing. The housing is provided with a displacement preventer that prevents displacement of the photo detector or the adhesive relative to the housing. The displacement preventer has fixing portions that extend along a plurality of directions. The photo detector is mounted on the housing by applying the adhesive to the displacement preventer.

10 Claims, 4 Drawing Sheets

OPTICAL PICKUP APPARATUS

CROSS-REFERENCE TO RELATED APPLICATIONS

This application claims priority from Japanese Patent Applications No. 2005-179041 filed on Jun. 20, 2005 and No. 2006-162175 filed on Jun. 12, 2006, which are herein incorporated by reference.

BACKGROUND OF THE INVENTION

1. Field of the Invention

The present invention relates to an optical pickup apparatus mounted on, for example, an optical disk apparatus and capable of reading information of a medium such as an optical disk.

2. Description of the Related Art

FIG. 4 is a perspective view of one implementation of a conventional optical pickup apparatus.

A photodetector 510 is mounted on a housing 550. The housing means a box that can house a thing, such as a box-shaped object that houses components, or an object similar to a box.

The photodetector 510 is a photo detector 510 that receives a portion of reflected light from an optical disk (not shown) to generate a light reception current proportional to the light reception amount. The light reception current is a detected signal. The photodetector 510 is adapted to receive light, convert the light signal to an electric signal, and output a signal to make a servo mechanism (not shown) of a lens holder (not shown) of the optical pickup apparatus 501 operate. The servo or servo mechanism means a mechanism that measures a state of an object to be controlled and compares the measurement with a reference value to correct the error automatically. The photodetector (Photo Detector) is abbreviated to "PD". The photo detector 510 is connected to a flexible circuit body 505. The photo detector 510 is fixed to a plate 520.

Description will be made of a process where the photo detector 510 is mounted on the housing 550. First, a light path position adjustment is performed for the photo detector 510. The X-axis of the photo detector 510, the Y-axis of the photo detector 510, and the Z-axis of the photo detector 510 are adjusted relative to an optical path (not shown) formed in the housing 550. After the attachment position of the photo detector 510 to the housing 550 is adjusted, a fixing adhesive (not shown) is applied to between the plate 520 mounted with the photo detector 510 and the housing 550 to form a bridge. Grooves 581 are made in fixing portions 580A, 580B of the housing 550 to allow the cured adhesive to exert an anchor effect for improving the adherence of the plate 520 with the photo detector 510 to the housing 550.

The conventional optical pickup apparatus 501 shown in FIG. 4 is similar to a photo detector attachment apparatus of an optical head, which alleviates instability factors in position accuracy of the photo detector, for example.

Such a conventional apparatus is disclosed in Japanese Patent Application Laid-Open Publication No. 2002-251776 (page 3, FIGS. 1 and 2), for example.

However, in the conventional optical pickup apparatus 501 shown in FIG. 4, since the grooves 581 extend along only one direction, i.e., the X-direction, a displacement may occur at the fixing portions 580A, 580B in the case of the optical pickup apparatus 501 being used under severe usage/environments where vibrations are frequently applied, for example. If a displacement occurs at the fixing portions 580A, 580B, light is not incident on the photo detector 510 accurately. As a result, there is concern about the occurrence of the problem that the optical pickup apparatus 501 does not operate normally.

SUMMARY OF THE INVENTION

It is therefore an object of the present invention to provide an optical pickup apparatus that operates stably without generating displacement of a photo detector under severe usage/environment.

The present invention to solve the above problem is mainly an optical pickup apparatus and includes a photo detector that receives light reflected from a medium and a housing that is mounted with the photo detector; the photo detector is fixed to the housing with the use of an adhesive to mount the photo detector on the housing; the housing is provided with a displacement preventer that prevents displacement of the photo detector or the adhesive relative to the housing; the displacement preventer has fixing portions extending along a plurality of directions; and the photo detector is mounted on the housing by applying the adhesive to the displacement preventer.

With the above configuration, the photo detector is fixed steadily to the housing with the adhesive and the displacement preventer. Since the housing is disposed with the displacement preventer that prevents the displacement of the photo detector or the adhesive relative to the housing and since the displacement preventer has the fixing portions extending along a plurality of directions, for example, even when intense vibrations are applied to the optical pickup apparatus, this configuration prevents the occurrence of a problem that the photo detector is displaced relative to the housing and that the optical pickup apparatus does not operate normally. The photo detector is fixed to the housing by the adhesive fixed firmly to the displacement preventer of the housing. Therefore, the present invention can provide the optical pickup apparatus that operates stably without generating displacement of the photo detector under severe usage/environment.

In the optical pickup apparatus according to the present invention, the displacement preventer includes a first fixing portion extending along a first direction and a second fixing portion extending along a second direction different from the first direction.

With the above configuration, the photo detector is fixed steadily to the housing by the adhesive and the first fixing portion and the second fixing portion of the displacement preventer disposed in the housing. Since the first fixing portion extending along the first direction and the second fixing portion extending along the second direction extend in different directions, even when complex vibrations are applied to the optical pickup apparatus, the photo detector continues to be fixed via the adhesive reliably by the first fixing portion and the second fixing portion. The first fixing portion extending along the first direction and the second fixing portion extending along the second direction act as a stopper that prevents the displacement of the photo detector relative to the housing.

In the optical pickup apparatus according to the present invention, the second fixing portion extending along the second direction is formed extending along the direction approximately orthogonal to the first fixing portion extending along the first direction.

With the above configuration, the photo detector is fixed steadily to the housing by the adhesive, the first fixing portion and the second fixing portion of the displacement preventer disposed in the housing. Since the second fixing portion extending along the second direction is formed extending along the direction approximately orthogonal to the first fixing portion extending along the first direction, the displacement of the photo detector is prevented from occurring relative to the housing of the optical pickup apparatus when complex vibrations are applied to the optical pickup apparatus. For example, even when the optical pickup apparatus resonates, the photo detector continues to be fixed to the housing via the adhesive reliably by the first fixing portion of the displacement preventer disposed in the housing and the second fixing portion formed extending along the second direction approximately orthogonal to the first direction along which the first fixing portion extends.

In the optical pickup apparatus according to the present invention, the first direction is a light axis direction of the light applied to the photo detector, and the second direction is a direction along an illumination plane to be illuminated when the light is applied to the photo detector.

The above configuration certainly prevents the occurrence of the problem that the photo detector is displaced relative to the housing of the optical pickup apparatus because of the complex vibrations applied to the optical pickup apparatus and that the optical pickup apparatus does not operate normally. Since the first fixing portion of the displacement preventer disposed in the housing extends along the light axis direction of the light applied to the photo detector, the displacement of the photo detector is prevented from occurring along the illumination plane of the photo detector when the optical pickup apparatus resonates. When a force is about to be applied to the photo detector in a direction along the illumination plane of the photo detector, the force in the direction along the illuminated plane of the photo detector is blocked by the first fixing portion of the displacement preventer extended along the light axis direction of the photo detector. Since the second fixing portion of the displacement preventer disposed in the housing extends along the illumination plane to be illuminated when the light is applied to the photo detector, the displacement of the photo detector is prevented from occurring along the light axis direction of the photo detector when the optical pickup apparatus resonates. When a force is about to be applied to the photo detector in the light axis direction of the photo detector, the force along the light axis direction of the photo detector is blocked by the second fixing portion of the displacement preventer extended along the illuminated plane of the photo detector. Therefore, this configuration reliably prevents the occurrence of the problem that the photo detector is displaced relative to the housing of the optical pickup apparatus because of the resonance generated in the optical pickup apparatus and that the optical pickup apparatus does not operate normally.

In the optical pickup apparatus according to the present invention, the displacement preventer further includes a separating portion that separates the first fixing portion and the second fixing portion.

The above configuration certainly prevents the displacement of the photo detector from occurring relative to the housing of the optical pickup apparatus. Since the separating portion is provided between the first fixing portion and the second fixing portion of the displacement preventer disposed in the housing to separate both the fixing portions, when the adhesive is used to mount the photo detector to the housing, the adhesive bridges the separating portion between the first fixing portion and the second fixing portion. In this way, the photo detector is fixed steadily to the housing. Since the adhesive bridges the separating portion separating the first fixing portion and the second fixing portion, even when intense vibrations are applied to the optical pickup apparatus in each direction, the displacement of the photo detector is prevented from occurring by the first fixing portion and the second fixing portion of the displacement preventer and the adhesive bridging the separating portion separating both the fixing portions. Therefore, the present invention can provide the optical pickup apparatus that operates stably.

In the optical pickup apparatus according to the present invention, the displacement preventer further includes a third fixing portion extending along a third direction different from the first direction and from the second direction.

With the above configuration, the photo detector is fixed more steadily to the housing. Since the displacement preventer disposed in the housing of the optical pickup apparatus includes the first fixing portion, the second fixing portion, and the third fixing portion extending along respective directions, the photo detector continues to be fixed reliably by the first fixing portion, the second fixing portion, the third fixing portion, and the adhesive even when intense vibrations are applied to the optical pickup apparatus. Therefore, when the optical pickup apparatus is used under severe usage/environment, the photo detector is prevented from being displaced relative to the housing thereby causing a malfunction of the optical pickup apparatus.

In the optical pickup apparatus according to the present invention, the third fixing portion extending along the third direction is formed extending along the direction approximately orthogonal to the first fixing portion extending along the first direction and the second fixing portion extending along the second direction.

With the above configuration, the photo detector is fixed steadily to the housing by the adhesive, and the first fixing portion, the second fixing portion, and the third fixing portion of the displacement preventer disposed in the housing. Since the third fixing portion extending along the third direction is formed extending along the direction approximately orthogonal to the first fixing portion extending along the first direction and the second fixing portion extending along the second direction, the displacement of the photo detector is reliably prevented from occurring relative to the housing of the optical pickup apparatus when complex vibrations are applied to the optical pickup apparatus. For example, even when the optical pickup apparatus resonates, the photo detector continues to be fixed to the housing via the adhesive reliably by the first fixing portion, the second fixing portion formed extending along the second direction approximately orthogonal to the first direction, and the third fixing portion extended along the third direction approximately orthogonal to the first direction and the second direction of the displacement preventer of the housing.

In the optical pickup apparatus according to the present invention, the third direction is a direction along the illumination plane to be illuminated when the light is applied to the photo detector.

The above configuration prevents the occurrence of the problem that the photo detector is displaced relative to the housing of the optical pickup apparatus because of the complex vibrations applied to the optical pickup apparatus and that the optical pickup apparatus does not operate normally. Since the third fixing portion of the displacement preventer disposed in the housing extends along the illumination plane to be illuminated when the light is applied to the photo detector, the displacement of the photo detector is prevented from occurring along the light axis direction of the photo detector when the optical pickup apparatus resonates. When a force is about to be applied to the photo detector in the light axis direction of the photo detector, the force along the light axis direction of the photo detector is blocked by the third fixing portion of the displacement preventer extended along the illuminated plane of the photo detector.

In the optical pickup apparatus according to the present invention, the displacement preventer further includes a separating portion that separates the first fixing portion and the third fixing portion.

The above configuration further prevents the displacement of the photo detector from occurring relative to the housing of the optical pickup apparatus. Since the separating portion is provided between the first fixing portion and the third fixing portion of the displacement preventer disposed in the housing to separate both the fixing portions, when the adhesive is used to mount the photo detector to the housing, the adhesive bridges the separating portion between the first fixing portion and the third fixing portion. In this way, the photo detector is fixed steadily to the housing. Since the adhesive bridges the separating portion separating the first fixing portion and the third fixing portion, if intense vibrations are applied to the optical pickup apparatus in each direction, the displacement of the photo detector is further prevented from occurring by the first fixing portion and the third fixing portion of the displacement preventer and the adhesive bridging the separating portion separating the both fixing portions. Therefore, the present invention can provide the optical pickup apparatus that operates stably.

In the optical pickup apparatus according to the present invention, the fixing portion includes at least one groove into which the adhesive can enter.

With the above configuration, the photo detector is fixed steadily to the housing. Since the adhesive enters into the groove of the fixing portion disposed in the displacement preventer of the housing, the photo detector is fixed to the housing steadily. Since the anchor effect is exerted on the adhesive that has entered and cured in the groove, the adhesive is fixed in the groove steadily. The anchor effect means that after an adhesive infiltrates into voids in a surface of a to-be-bonded member and cures, it acts as a nail or wedge. The anchor effect is also referred to as an anchoring effect or a fastener effect. Since the anchor effect is exerted on the adhesive that has entered and cured in the groove, the displacement of the adhesive is prevented from occurring even when intense vibrations are applied to the housing of the optical pickup apparatus. Therefore, the photo detector is fixed to the housing steadily by the adhesive that has entered into the groove of the fixing portion of the displacement preventer of the housing.

In the optical pickup apparatus according to the present invention, the displacement preventer is disposed on a projecting portion projecting from the housing.

With the above configuration, the photo detector is fixed steadily to the housing. When the photo detector is fixed to the housing, the adhesive is applied to the displacement preventer of the projecting portion projecting from the housing to fix the photo detector steadily to the housing. Since the projecting portion projects from the housing, the application operation of the adhesive is performed more easily for mounting the photo detector to the housing. Since the projecting portion including the displacement preventer projects from the housing to apply the adhesive to, the displacement of the photo detector is more easily prevented from occurring relative to the housing.

In the optical pickup apparatus according to the present invention, the photo detector is mounted on a fixing plate that allows the photo detector to be positioned easily with respect to the housing, and the adhesive is applied to the fixing plate and the displacement preventer of the housing.

With the above configuration, the photo detector is mounted accurately to the housing. If the photo detector has been mounted on the fixing plate when the photo detector is mounted to the housing with the use of the adhesive, the positioning of the photo detector can be performed easily when attached to the housing. When the photo detector is mounted to the housing, for example, the attachment position of the fixing plate with the photo detector is adjusted relative to the housing while the light path adjustment is performed, and after the attachment position of the fixing plate is set, the adhesive is applied to the displacement preventer of the housing and the fixing plate, thus mounting the photo detector to the housing accurately.

In the optical pickup apparatus according to the present invention, the adhesive used is an ultraviolet curing adhesive that is cured when irradiated by ultraviolet.

With the above configuration, the photo detector is mounted and fixed to the housing quickly and accurately. The ultraviolet curing adhesive is cured simply by irradiating the applied adhesive with ultraviolet light. If the ultraviolet curing adhesive is used when the photo detector is mounted on the housing, the adhesive is quickly solidified. Therefore, the displacement of the photo detector is prevented from occurring relative to the housing in the course of the curing of the adhesive, and the photo detector is mounted on the housing accurately.

In the optical pickup apparatus according to the present invention, an epoxy adhesive is used as the adhesive.

With the above configuration, the photo detector is mounted and fixed accurately to the housing. The epoxy adhesive has low contractility and excellent heat resistance. Since the epoxy adhesive has low contractility, the photo detector is mounted highly accurately to the housing. Since the epoxy adhesive has excellent heat resistance, for example, when the housing of the optical pickup apparatus is at a high temperature, the adhesive is prevented from changing in quality considerably under the influence of heat. If the optical pickup apparatus is at a high temperature, the photo detector continues to be mounted accurately and reliably on the housing by the epoxy adhesive.

The optical pickup apparatus according to the present invention can be mounted on an optical disk apparatus of a portable computer.

The above configuration prevents the occurrence of the problem that the optical pickup apparatus malfunctions in the optical disk apparatus of the portable computer and that the portable computer does not operate normally. The portable computer includes a laptop computer and a notebook computer, for example. The portable computer such as a laptop computer or a notebook computer is increasingly being miniaturized, thinned, and lightened, and correspondingly, the optical pickup apparatus is also increasingly being miniaturized, thinned, and lightened. For example, when the portable computer is moved, if intense vibrations are applied to the computer, the present invention prevents the occurrence of a problem that the photo detector is displaced relative to the housing of the optical pickup apparatus and that the optical pickup apparatus does not operate normally. The photo detector continues to be fixed to the housing by the adhesive fixed firmly to the displacement preventer of the housing. Therefore, the present invention can provide the small and thin optical pickup apparatus that operates stably under severe usage/environment where intense vibrations are applied.

BRIEF DESCRIPTION OF THE DRAWINGS

To understand the present invention and the advantages thereof more thoroughly, the following description should be referenced along with the accompanying drawings, in which.

DETAILED DESCRIPTION OF THE INVENTION

From the contents of the description and the accompanying drawings, at least the following details will be apparent.

Figure 1:
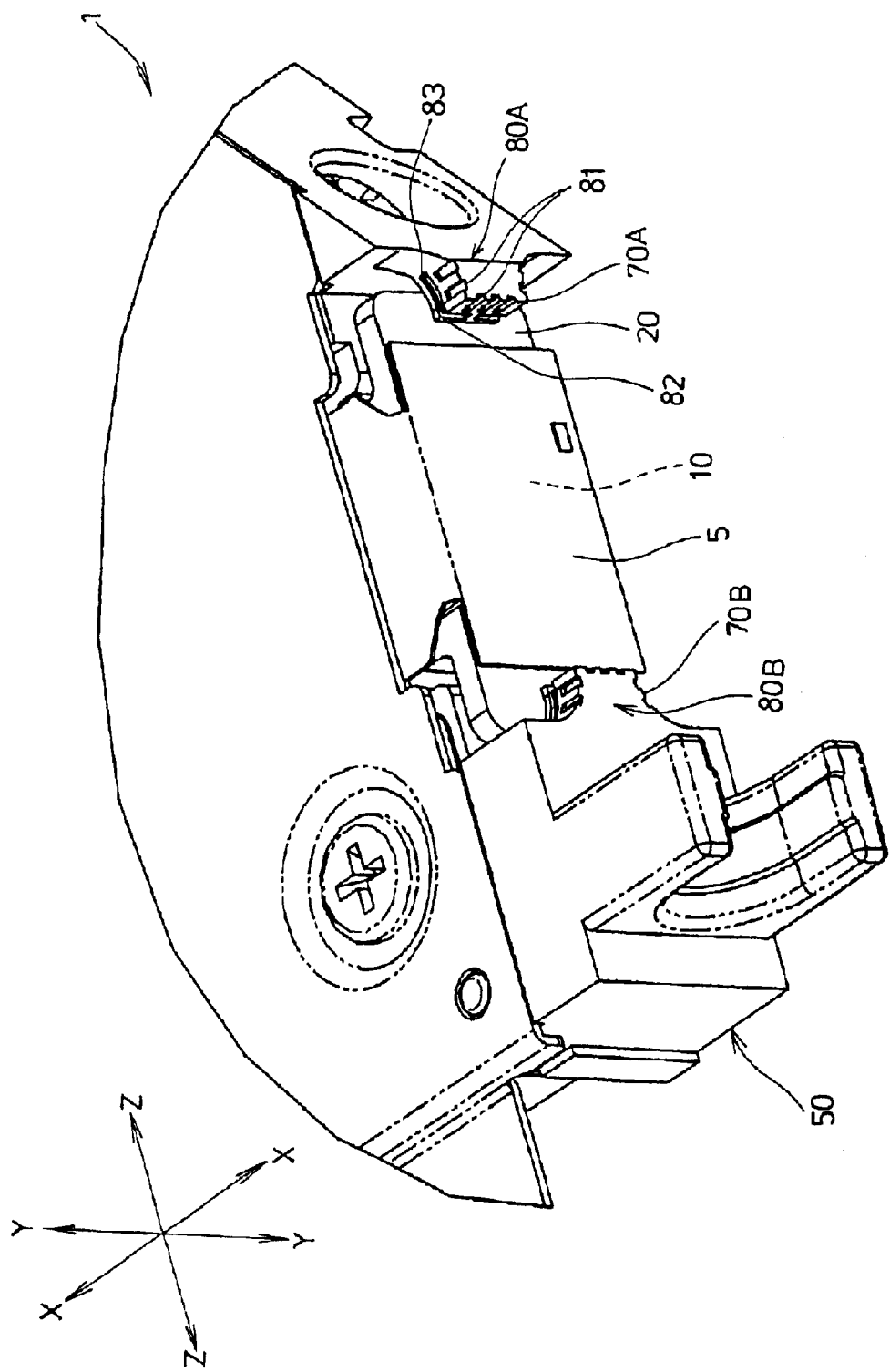
FIG. 1 is a perspective view of one implementation of an optical pickup apparatus according to the present invention.
Figure 2:
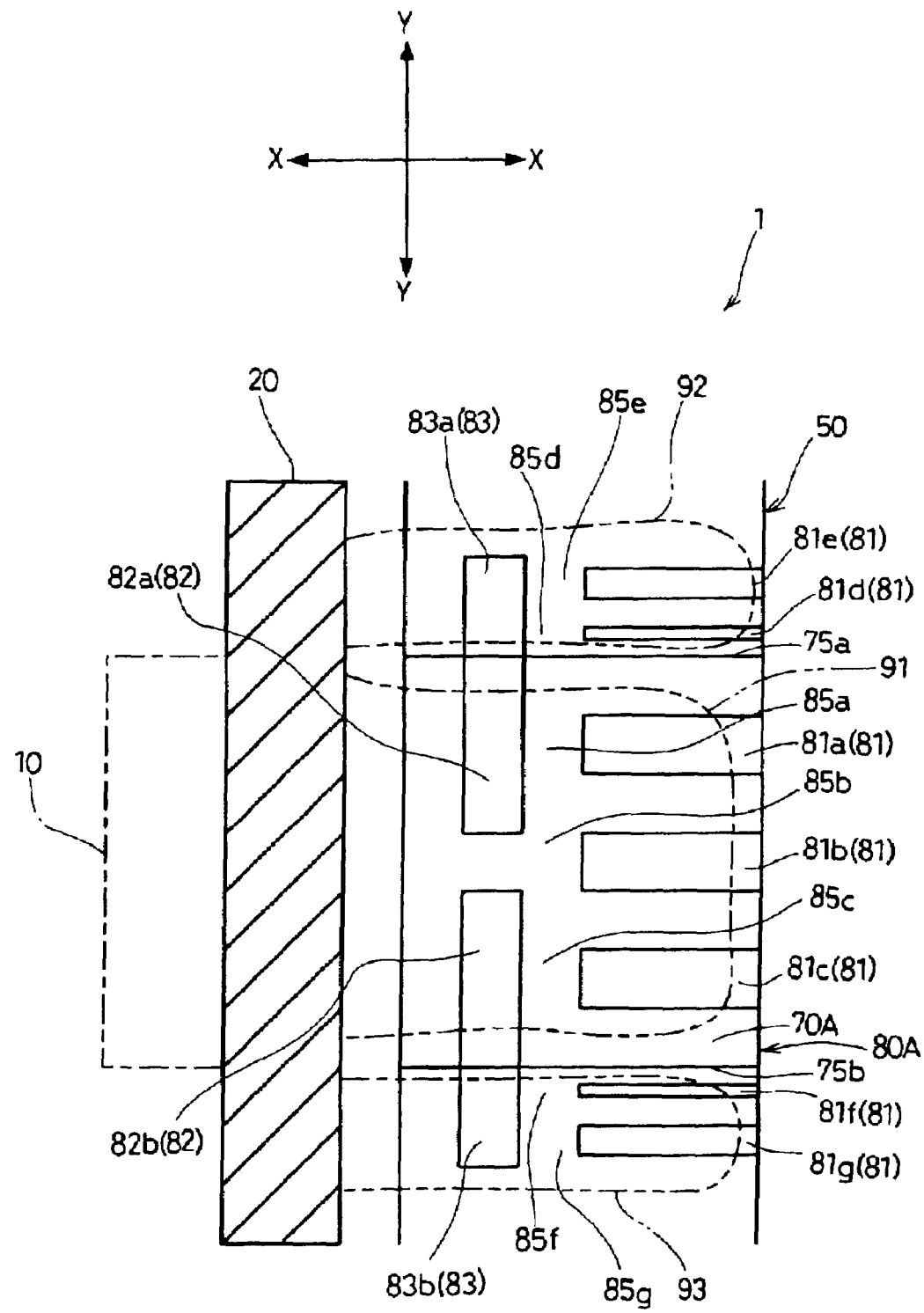
FIG. 2 is an enlarged explanatory diagram of a displacement preventer of the optical pickup apparatus.

FIG. 1 is a perspective view of one implementation of an optical pickup apparatus according to the present invention; FIG. 2 is an enlarged explanatory diagram of a displacement preventer of the optical pickup apparatus; and FIG. 3 is an enlarged plan view of the same displacement preventer of the optical pickup apparatus.

Figure 3:
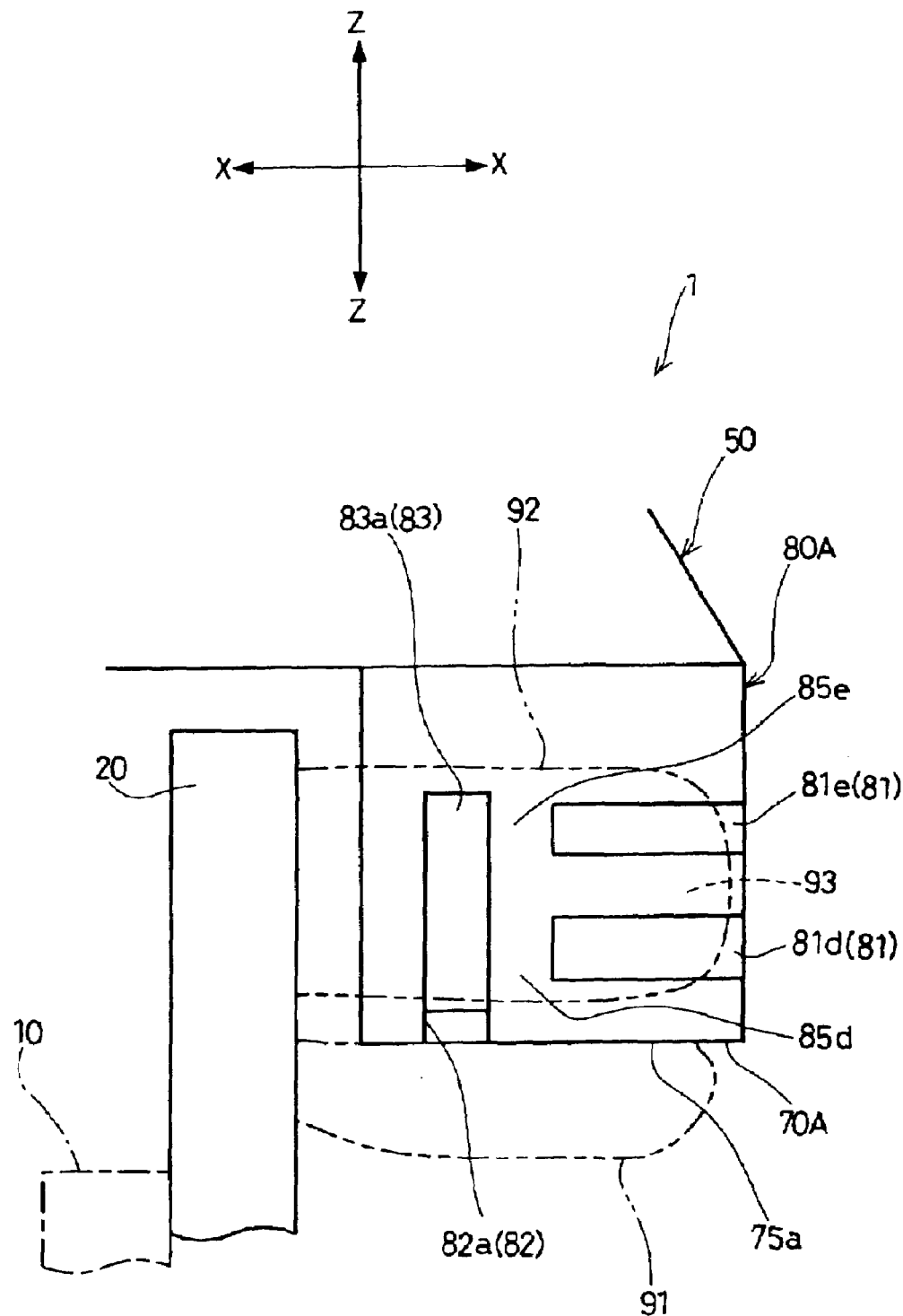
FIG. 3 is an enlarged plan view of the same displacement preventer of the optical pickup apparatus.
Figure 4:
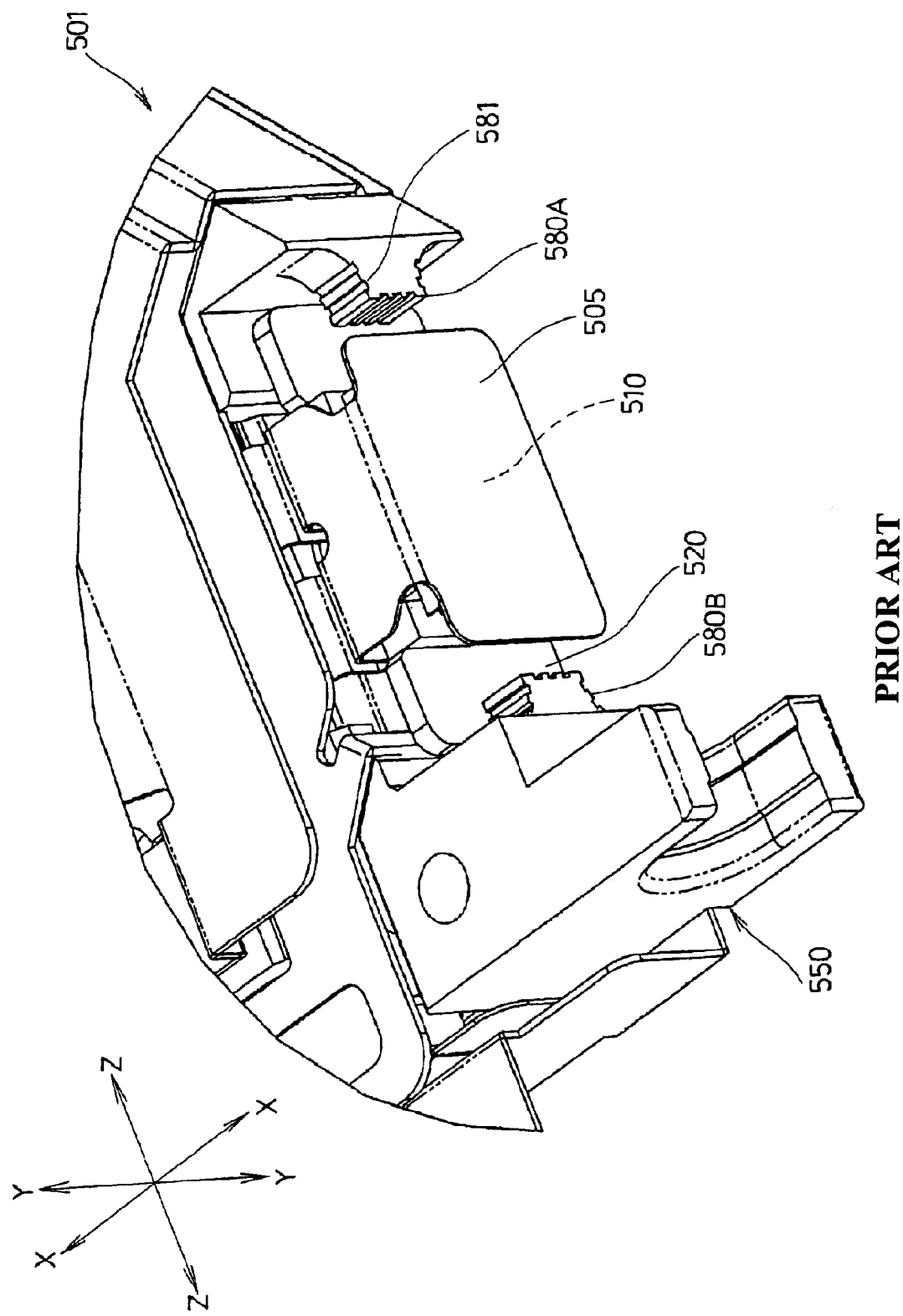
FIG. 4 is a perspective view of an implementation of a conventional optical pickup apparatus.

As shown in FIGS. 1 to 3, a direction along the X-X axis is the depth direction of the optical pickup apparatus 1. As shown in FIGS. 1 and 2, a direction along the Y-Y axis is the height direction of the optical pickup apparatus 1. As shown in FIGS. 1 and 3, a direction along the Z-Z axis is the width direction of the optical pickup apparatus 1. In FIG. 2, a direction vertical to the page is the Z-Z axis direction of the optical pickup apparatus 1. In FIG. 3, a direction vertical to the page is the Y-Y axis direction of the optical pickup apparatus 1. Each direction X, Y, Z in this specification is defined for convenience to describe the optical pickup apparatus 1.

A medium (not shown) such as an optical disk (not shown) is inserted into an optical disk apparatus (not shown). The optical pickup apparatus 1 mounted on the optical disk apparatus is used to reproduce data such as information recorded on the optical disk. The optical disk apparatus is also used to record data such as information. Such optical disks include, for example, a read only optical disk such as "CD-ROM" or "DVD-ROM", a recordable optical disk such as "CD-R", "DVD-R", or "DVD+R", a writable/erasable or rewritable optical disk such as "CD-RW", "DVD-RW", "DVD+RW" (registered trademark), "DVD-RAM", "HD DVD" (registered trademark), or "Blu-ray Disc" (registered trademark), etc.

The optical disks include, for example, an optical disk (not shown) provided with signal surfaces (not shown) on both sides and capable of data write/erase or data rewrite. The optical disks further include, for example, an optical disk (not shown) provided with two layers of signal surfaces (not shown) and capable of data write/erase or data rewrite.

"CD" is an abbreviation of "Compact Disc" (trademark) "DVD" (registered trademark) is an abbreviation of "Digital Versatile Disc" or "Digital Video Disc". "ROM" of "CD-ROM" or "DVD-ROM" is an abbreviation of "Read Only Memory", and CD-ROM or DVD-ROM is only for reading data. "R" of "CD-R", "DVD-R", or "DVD+R" is an abbreviation of "Recordable", and CD-R, DVD-R, or DVD+R are data recordable. "RW" of "CD-RW", "DVD-RW", or "DVD+RW" is an abbreviation of "ReWritable", and CD-RW, DVD-RW, or DVD+RW are data rewritable. "DVD-RAM" is an abbreviation of "Digital Versatile Disc Random Access Memory" and is data readable/writable/erasable.

"HD DVD" is an abbreviation of "High Definition DVD". "HD DVD" is compatible with a conventional DVD series and has a greater storage capacity than the disks of the conventional DVD series do. A red/near-infrared laser has been used for conventional CDs. A red laser has been used for conventional DVDs. However, a blue-violet laser is used when reading data/information recorded on a "HD DVD" optical disk 200. "Blu-ray" refers to a blue-violet laser that is employed to achieve high-density recording instead of the conventional red laser used for reading/writing signals.

As shown in FIG. 1, a photo detector 10 is mounted on a die-cast housing 50. The photo detector 10 receives a portion of reflected light from an optical disk (not shown) to generate a light reception current proportional to the light reception amount. The light reception current is a detected signal. The photo detector 10 is adapted to receive laser light, convert the light signal to an electric signal, and output a signal to make a servo mechanism (not shown) of a lens holder (not shown) of the optical pickup apparatus 1 operate. The photo detector is referred to as PD or PDIC. "PDIC" is an abbreviation of "Photo Diode IC". The PDIC 10 is mounted on and fixed to an aluminum-made plate 20. The PDIC 10 is connected to a flexible substrate 5 such that it can be supplied with electricity.

The flexible substrate 5 is formed as a flexible printed circuit. The flexible printed circuit is abbreviated to "FPC". The FPC is formed by printing a plurality of circuit conductors (not shown) on an insulating sheet (not shown), disposing a metal, e.g. copper, foil (not shown) on the insulating sheet, and disposing a transparent or semi-transparent protection layer (not shown) thereon. For convenience, the FPC 5 is shown with the circuit conductors of the insulating sheet omitted.

The optical pickup apparatus 1 is configured with the above various components. Although the optical pickup apparatus 1 includes other components (not shown) than the shown components, the other components are omitted for convenience in FIGS. 1 to 3.

As shown in FIG. 1, the optical pickup apparatus 1 is configured to include the PDIC 10 that receives laser light reflected by a medium (not shown) such as an optical disk (not shown), a plate 20 to be mounted with the PDIC 10, and the housing 50 in which the plate 20 with the PDIC 10 is mounted.

The plate 20 with the PDIC 10 is fixed to the housing 50 with the use of adhesives 91, 92, 93 (FIGS. 2 and 3) that adhere the plate 20 with the PDIC 10 to the housing 50. The same type of adhesive is used for the adhesives 91, 92, 93. A pair of displacement preventers 80A, 80B (FIG. 1) is provided on the housing 50 for preventing displacement of the plate 20 with the PDIC 10 or the solidified adhesives 91, 92, 93. Each displacement preventer 80A, 80B has a plurality of fixing portions 81, 82, 83 that extend along a plurality of directions X, Y, Z. The adhesives 91, 92, 93 (FIGS. 2 and 3) are applied to each displacement preventer 80A, 80B to mount the plate 20 with the PDIC 10 on the housing 50.

If the plate 20 with the PDIC 10 is mounted on the housing 50 in this way, the plate 20 with the PDIC 10 is fixed reliably to the housing 50 with the adhesives 91, 92, 93 and the displacement preventers 80A, 80B provided on the housing 50.

The housing 50 is provided with a pair of the displacement preventers 80A, 80B that prevents the displacement of the plate 20 with the PDIC 10 or the solidified adhesives 91, 92, 93 relative to the housing 50 and each displacement preventer 80A, 80B has a plurality of the fixing portions 81, 82, 83 extending along a plurality of directions X, Y, Z. Hence, for example, even when intense vibrations are applied to the optical pickup apparatus 1, the problem is prevented from occurring that the plate 20 with the PDIC 10 is displaced relative to the housing 50 and that the optical pickup apparatus 1 does not operate normally. The plate 20 with the PDIC 10 is fixed to the housing 50 by each adhesive 91, 92, 93 fixed firmly to the displacement preventers 80A, 80B of the housing 50.

Therefore, users of the optical pickup apparatus 1, assembling manufacturers of the optical disk apparatus (not shown) with the optical pickup apparatus 1, etc., can be provided with the optical pickup apparatus 1 that operates stably without generating displacement of the plate 20 with the PDIC 10 under severe usage/environment.

Each displacement preventer 80A, 80B (FIG. 1) includes each first fixing portion 81*a*, 81*b*, 81*c*, 81*d*, 81*e*, 81*f*, 81*g* (FIG. 2) extending along a first direction X and each second fixing portion 82*a*, 82*b* extending along a second direction Y different from the first direction X.

If each displacement preventer 80A, 80B is formed in this way, the plate 20 with the PDIC 10 is fixed reliably to the housing 50 by the each adhesive 91, 92, 93 and by each first fixing portion 81*a*, 81*b*, 81*c*, 81*d*, 81*e*, 81*f*, 81*g* and each second fixing portion 82*a*, 82*b* of the displacement preventers 80A, 80B disposed on the housing 50.

Since each first fixing portion 81*a*, 81*b*, 81*c*, 81*d*, 81*e*, 81*f*, 81*g* extending along the first direction X and each second fixing portion 82*a*, 82*b* extending along the second direction Y extend in different directions, even when complex vibrations are applied to the optical pickup apparatus 1, the plate 20 with the PDIC 10 continues to be fixed reliably via the adhesive 91, 92, 93 to each first fixing portion 81*a*, 81*b*, 81*c*, 81*d*, 81*e*, 81*f*, 81*g* and each second fixing portion 82*a*, 82*b*. Each first fixing portion 81*a*, 81*b*, 81*c*, 81*d*, 81*e*, 81*f*, 81*g* extending along the first direction X and each second fixing portion 82*a*, 82*b* extending along the second direction Y act as stoppers that prevent the displacement of the plate 20 with the PDIC 10 relative to the housing 50.

The displacement preventers 80A, 80B disposed on a pair of projecting portions 70A, 70B are formed approximately symmetrical around a portion where the PDIC 10 is positioned.

Each second fixing portion 82*a*, 82*b* extending along the second direction Y is formed extending approximately orthogonal to each first fixing portion 81*a*, 81*b*, 81*c*, 81*d*, 81*e*, 81*f*, 81*g* extending along the first direction X.

By this means, the plate 20 with the PDIC 10 is fixed reliably to the housing 50 by each adhesive 91, 92, 93 and by each first fixing portion 81*a*, 81*b*, 81*c*, 81*d*, 81*e*, 81*f*, 81*g* and each second fixing portion 82*a*, 82*b* of the displacement preventers 80A, 80B disposed on the housing 50. Since each second fixing portion 82*a*, 82*b* extending along the second direction Y is formed extending approximately orthogonal to each first fixing portion 81*a*, 81*b*, 81*c*, 81*d*, 81*e*, 81*f*, 81*g* extending along the first direction X, the displacement of the plate 20 with the PDIC 10 is prevented from occurring relative to the housing 50 of the optical pickup apparatus 1 when complex vibrations are applied to the optical pickup apparatus 1.

For example, even when the optical pickup apparatus 1 resonates, the plate 20 with the PDIC 10 continues to be fixed reliably to the housing 50 via each adhesive 91, 92, 93 by each first fixing portion 81*a*, 81*b*, 81*c*, 81*d*, 81*e*, 81*f*, 81*g* of the displacement preventers 80A, 80B provided on the housing 50 and by each second fixing portion 82*a*, 82*b* formed extending along the second direction Y approximately orthogonal to the first direction X in which each first fixing portion 81*a*, 81*b*, 81*c*, 81*d*, 81*e*, 81*f*, 81*g* extends.

The first direction X (FIG. 1) is a light axis direction of the laser light applied to the PDIC 10. The second direction Y is a direction along an illumination plane to be illuminated when the laser light is applied to the PDIC 10.

This configuration reliably prevents the occurrence of the problem that the plate 20 with the PDIC 10 is displaced relative to the housing 50 of the optical pickup apparatus 1 because of complex vibrations applied to the optical pickup apparatus and that the optical pickup apparatus 1 does not operate normally.

Since each first fixing portion 81*a*, 81*b*, 81*c*, 81*d*, 81*e*, 81*f*, 81*g* of the displacement preventers 80A, 80B provided on the housing 50 extends along the light axis direction of the laser light applied to the PDIC 10, the displacement of the plate 20 with the PDIC 10 is prevented from occurring along the illumination plane of the PDIC 10 when the optical pickup apparatus 1 resonates.

When a force is about to be applied to the plate 20 with the PDIC 10 in a direction along the illumination plane of the PDIC 10, the force in the direction along the illuminated plane of the PDIC 10 is blocked by each first fixing portion 81*a*, 81*b*, 81*c*, 81*d*, 81*e*, 81*f*, 81*g* of the displacement preventers 80A, 80B extended along the light axis direction of the PDIC 10.

Since each second fixing portion 82*a*, 82*b* of the displacement preventers 80A, 80B provided on the housing 50 extends along the illumination plane to be illuminated when the laser light is applied to the PDIC 10, the displacement of the plate 20 with the PDIC 10 is prevented from occurring along the light axis direction of the PDIC 10 when the optical pickup apparatus 1 resonates.

When a force along the light axis direction of the PDIC 10 is about to be applied to the plate 20 with the PDIC 10, the force along the light axis direction of the PDIC 10 is blocked by each second fixing portion 82*a*, 82*b* of the displacement preventers 80A, 80B extended along the illuminated plane of the PDIC 10.

Therefore, this configuration reliably prevents the occurrence of the problem that the plate 20 with the PDIC 10 is displaced relative to the housing 50 of the optical pickup apparatus 1 because of the resonance generated in the optical pickup apparatus 1 and that the optical pickup apparatus 1 does not operate normally.

As shown in FIG. 2, the displacement preventer 80A (80B) further includes first separating portions 85*a*, 85*b*, 85*c* that separate the first fixing portion 81*a*, 81*b*, 81*c* and the second fixing portion 82*a*, 82*b*.

If the first separating portions 85*a*, 85*b*, 85*c* are included in the displacement preventers 80A, 80B, the displacement of the plate 20 with the PDIC 10 is reliably prevented from occurring relative to the housing 50 of the optical pickup apparatus 1. Since the first separating portions 85*a*, 85*b*, 85*c* are provided in between the first fixing portion 81*a*, 81*b*, 81*c* and the second fixing portion 82*a*, 82*b* of the displacement preventer 80A, 80B provided on the housing 50 to separate both the fixing portions 81*a*, 81*b*, 81*c* and 82*a*, 82*b*, when the adhesive 91 is used to mount the plate 20 with the PDIC 10 on the housing 50, the adhesive 91 bridges the first separating portions 85*a*, 85*b*, 85*c* between the first fixing portion 81*a*, 81*b*, 81*c* and the second fixing portion 82*a*, 82*b*.

By this means, the plate 20 with the PDIC 10 is fixed reliably to the housing 50. Since the adhesive 91 bridges the first separating portions 85*a*, 85*b*, 85*c* separating the first fixing portion 81*a*, 81*b*, 81*c* and the second fixing portion 82*a*, 82*b*, even when intense vibrations are applied to the optical pickup apparatus 1 in each direction, the displacement of the plate 20 with the PDIC 10 is prevented from occurring by the first fixing portion 81a, 81b, 81c and the second fixing portion 82a, 82b of the displacement preventer 80A, 80B and by the adhesive 91 bridging the first separating portions 85a, 85b, 85c that separate both the fixing portions 81a, 81b, 81c and 82a, 82b. Therefore, the users of the optical pickup apparatus 1, the assembling manufacturers of the optical disk apparatus (not shown) with the optical pickup apparatus 1, etc., can be provided with the optical pickup apparatus 1 that operates stably.

The displacement preventer 80A, 80B provided on the housing 50 further includes third fixing portions 83a, 83b extended along a third direction Z different from the first direction X and different from the second direction Y as well.

Since the third fixing portions 83a, 83b are included in the displacement preventer 80A, 80B, the plate 20 with the PDIC 10 is fixed more reliably to the housing 50. Since each displacement preventer 80A, 80B provided on the housing 50 of the optical pickup apparatus 1 includes the first fixing portions 81a, 81b, 81c, 81d, 81e, 81f, 81g, the second fixing portions 82a, 82b, and the third fixing portions 83a, 83b extended along respective directions, the plate 20 with the PDIC 10 continues to be fixed reliably by each first fixing portion 81a, 81b, 81c, 81d, 81e, 81f, 81g, each second fixing portion 82a, 82b, each third fixing portion 83a, 83b, and each adhesive 91, 92, 93 even when intense vibrations are applied to the optical pickup apparatus 1. Therefore, when the optical pickup apparatus 1 is used under severe usage/environment, the plate 20 with the PDIC 10 is prevented from being displaced relative to the housing 50 thereby causing a malfunction of the optical pickup apparatus 1.

Each third fixing portion 83a, 83b extending along the third direction Z extends approximately orthogonal to each first fixing portion 81a, 81b, 81c, 81d, 81e, 81f, 81g extending along the first direction X and to each second fixing portion 82a, 82b extending along the second direction Y and is formed extending in a curved shape at a respective corner 75a, 75b of each projecting portion 70A, 70B projecting from the housing 50.

The plate 20 with the PDIC 10 is fixed reliably to the housing 50 by each solidified adhesive 91, 92, 93, and by each first fixing portion 81a, 81b, 81c, 81d, 81e, 81f, 81g, each second fixing portion 82a, 82b, and each third fixing portion 83a, 83b of the displacement preventer 80A, 80B provided on the housing 50.

Since each third fixing portion 83a, 83b extending along the third direction Z extends approximately orthogonal to each first fixing portion 81a, 81b, 81c, 81d, 81e, 81f, 81g extending along the first direction X and each second fixing portion 82a, 82b extending along the second direction Y and is formed extending in a curved shape, the displacement of the plate 20 with the PDIC 10 is reliably prevented from occurring relative to the housing 50 of the optical pickup apparatus 1 when complex vibrations are applied to the optical pickup apparatus 1.

For example, even when the optical pickup apparatus 1 resonates, the plate 20 with the PDIC 10 continues to be fixed reliably to the housing 50 via each adhesive 91, 92, 93 by each first fixing portion 81a, 81b, 81c, 81d, 81e, 81f, 81g, each second fixing portion 82a, 82b formed extending along the second direction Y approximately orthogonal to the first direction X, and by each third fixing portion 83a, 83b extending along the third direction Z approximately orthogonal to the first direction X and the second direction Y, of the displacement preventer 80A, 80B provided on the housing 50.

The third direction Z is a direction along the illumination plane to be illuminated when the laser light is applied to the PDIC 10.

This means prevents the occurrence of the problem that the plate 20 with the PDIC 10 is displaced relative to the housing 50 of the optical pickup apparatus 1 when complex vibrations are applied to the optical pickup apparatus 1 and that the optical pickup apparatus 1 does not operate normally. Since each third fixing portion 83a, 83b of the displacement preventer 80A, 80B provided on the housing 50 extends along the illumination plane to be illuminated when the laser light is applied to the PDIC 10, the displacement of the plate 20 with the PDIC 10 is prevented from occurring along the light axis direction of the PDIC 10 when the optical pickup apparatus 1 resonates. When a force is about to be applied to the plate 20 with the PDIC 10 along the light axis direction of the PDIC 10, the force along the light axis direction of the PDIC 10 is blocked by each third fixing portion 83a, 83b of the displacement preventer 80A, 80B extended along the illumination plane of the PDIC 10.

As shown in FIG. 2, the displacement preventer 80A (80B) disposed in the housing 50 further includes second separating portions 85d, 85e, 85f, 85g that separate the first fixing portion 81e, 81f, 81g and the third fixing portion 83a, 83b. Describing in detail with reference to FIG. 3, the displacement preventer 80A (80B) disposed in the housing 50 further includes the second separating portions 85d, 85e that separate the first fixing portion 81d, 81e and the third fixing portion 83a.

Since the second separating portions 85d, 85e, 85f, 85g are provided in the displacement preventer 80A, 80B disposed in the housing 50 of the optical pickup apparatus 1, the displacement of the plate 20 with the PDIC 10 is further prevented from occurring relative to the housing 50 of the optical pickup apparatus 1. Since the second separating portions 85d, 85e, 85f, 85g are provided between the first fixing portion 81d, 81e, 81f, 81g and the third fixing portion 83a, 83b of the displacement preventer 80A, 80B disposed in the housing 50 to separate both the fixing portions 81d, 81e, 81f, 81g and 83a, 83b, when the adhesives 92, 93 are used to mount the plate 20 with the PDIC 10 on the housing 50, the adhesives 92, 93 bridge the second separating portions 85d, 85e, 85f, 85g between the first fixing portion 81d, 81e, 81f, 81g and the third fixing portion 83a, 83b. By this means, the plate 20 with the PDIC 10 is fixed reliably to the housing 50.

Since the adhesives 92, 93 bridge the second separating portions 85d, 85e, 85f, 85g separating the first fixing portion 81d, 81e, 81f, 81g and the third fixing portion 83a, 83b, even when intense vibrations are applied to the optical pickup apparatus 1 in each direction, the displacement of the plate 20 with the PDIC 10 is prevented from occurring by the first fixing portion 81d, 81e, 81f, 81g and the third fixing portion 83a, 83b of the displacement preventer 80A, 80B and by the adhesives 92, 93 bridging the second separating portions 85d, 85e, 85f, 85g separating both the fixing portions 81d, 81e, 81f, 81g and 83a, 83b. Therefore, the users of the optical pickup apparatus 1, the assembling manufacturers of the optical disk apparatus (not shown) with the optical pickup apparatus 1, etc., can be provided with the optical pickup apparatus 1 that operates stably.

The fixing portions 81, 82, 83 disposed in the displacement preventers 80A, 80B of the housing 50 (FIG. 1) include grooves 81, 82, 83 (FIG. 1) with a cross section in an approximately rectangular shape, into which the adhesives 91, 92, 93 (FIGS. 2 and 3) can enter. Describing in detail with reference to FIG. 2, the fixing portions 81a, 81b, 81c, 81d, 81e, 81f, 81g, 82*a*, 82*b*, 83*a*, 83*b* include the grooves 81*a*, 81*b*, 81*c*, 81*d*, 81*e*, 81*f*, 81*g*, 82*a*, 82*b*, 83*a*, 83*b* into which the adhesives 91, 92, 93 can enter.

The first separating portions 85*a*, 85*b*, 85*c* separating the first grooves 81*a*, 81*b*, 81*c* and the second grooves 82*a*, 82*b* are formed as first dividing walls 85*a*, 85*b*, 85*c*. The second separating portions 85*d*, 85*e*, 85*f*, 85*g* separating the first grooves 81*d*, 81*e*, 81*f*, 81*g* and the third grooves 83*a*, 83*b* are formed as second dividing walls 85*d*, 85*e*, 85*f*, 85*g*.

Since the displacement preventers 80A, 80B of the housing 50 are formed uneven in this way, the plate 20 with the PDIC 10 is fixed reliably to the housing 50. By the adhesives 91, 92, 93 entering into the grooves 81*a*, 81*b*, 81*c*, 81*d*, 81*e*, 81*f*, 81*g*, 82*a*, 82*b*, 83*a*, 83*b* of the fixing portions 81*a*, 81*b*, 81*c*, 81*d*, 81*e*, 81*f*, 81*g*, 82*a*, 82*b*, 83*a*, 83*b* disposed in the displacement preventers 80A, 80B of the housing 50, the plate 20 with the PDIC 10 is fixed to the housing 50 reliably.

Since an anchor effect is exerted on the adhesives 91, 92, 93 that have entered and cured in the grooves 81*a*, 81*b*, 81*c*, 81*d*, 81*e*, 81*f*, 81*g*, 82*a*, 82*b*, 83*a*, 83*b*, the adhesives 91, 92, 93 are fixed in the grooves 81*a*, 81*b*, 81*c*, 81*d*, 81*e*, 81*f*, 81*g*, 82*a*, 82*b*, 83*a*, 83*b* reliably. The anchor effect means that after the adhesive infiltrates into voids in the surface of a to-be-bonded member and cures, it acts as a nail or wedge. The anchor effect is also referred to as an anchoring effect or fastener effect.

Since the anchor effect is exerted on the adhesives 91, 92, 93 that have entered and solidified in the grooves 81*a*, 81*b*, 81*c*, 81*d*, 81*e*, 81*f*, 81*g*, 82*a*, 82*b*, 83*a*, 83*b*, the displacement of the solidified adhesives 91, 92, 93 is prevented from occurring even when intense vibrations are applied to the housing 50 of the optical pickup apparatus 1.

Therefore, the plate 20 with the PDIC 10 is fixed to the housing 50 reliably by the adhesives 91, 92, 93 that have entered into the grooves 81*a*, 81*b*, 81*c*, 81*d*, 81*e*, 81*f*, 81*g*, 82*a*, 82*b*, 83*a*, 83*b* of the fixing portions 81*a*, 81*b*, 81*c*, 81*d*, 81*e*, 81*f*, 81*g*, 82*a*, 82*b*, 83*a*, 83*b*, of the displacement preventers 80A, 80B of the housing 50.

The displacement preventers 80A, 80B are provided on a pair of the projecting portions 70A, 70B opposite to each other and projecting from the housing 50. The pair of the projecting portions 70A, 70B opposite to each other and projecting from the housing 50 is formed approximately symmetrical around a portion where the PDIC 10 is positioned.

By this means, the plate 20 with the PDIC 10 is fixed reliably to the housing 50. When the plate 20 with the PDIC 10 is fixed to the housing 50, the adhesives 91, 92, 93 are applied to the displacement preventers 80A, 80B of the projecting portions 70A, 70B projecting from the housing 50, thereby reliably fixing the plate 20 with the PDIC 10 to the housing 50.

By making the projecting portions 70A, 70B project from the housing 50, the application of the adhesives 91, 92, 93 becomes easy to perform for mounting the plate 20 with the PDIC 10 to the housing 50. Since the projecting portions 70A, 70B, which include the displacement preventers 80A, 80B to apply the adhesives 91, 92, 93 to, project from the housing 50, the displacement of the plate 20 with the PDIC 10 is easily prevented from occurring relative to the housing 50.

The PDIC 10 is mounted on the plate 20 that allows the PDIC 10 to be positioned easily with respect to the housing 50. The adhesives 91, 92, 93 are applied to the plate 20 mounted with the PDIC 10 and the displacement preventers 80A, 80B of the housing 50.

By this means, the plate 20 with the PDIC 10 is mounted accurately to the housing 50. If the PDIC 10 has been mounted on the plate 20 when the plate 20 with the PDIC 10 is mounted on the housing 50 with the use of the adhesives 91, 92, 93, the PDIC 10 can be easily positioned with respect to the housing 50 when attached thereto.

When the PDIC 10 is mounted on the housing 50, for example, the attachment position of the plate 20 with the PDIC 10 is adjusted relative to the housing while the light path adjustment is performed, and after the attachment position of the plate 20 is set, the adhesives 91, 92, 93 are applied to the displacement preventers 80A, 80B of the housing 50 and the plate 20, thus mounting the plate 20 with the PDIC 10 to the housing 50 accurately.

The adhesives 91, 92, 93 used are ultraviolet curing adhesives 91, 92, 93 that are cured when irradiated by ultraviolet.

In this way, the plate 20 with the PDIC 10 is mounted and fixed to the housing 50 quickly and accurately. The ultraviolet curing adhesives 91, 92, 93 are cured simply by irradiating the applied adhesives 91, 92, 93 with ultraviolet light. If the ultraviolet curing adhesives 91, 92, 93 are used when the plate 20 with the PDIC 10 is mounted on the housing 50, the adhesives 91, 92, 93 are quickly solidified. Therefore, the displacement of the plate 20 with the PDIC 10 is prevented from occurring relative to the housing 50 in the course of the curing of the adhesives 91, 92, 93, and the plate 20 with the PDIC 10 is mounted on the housing 50 accurately.

Epoxy adhesives 91, 92, 93 are used as the adhesives 91, 92, 93.

Therefore, the plate 20 with the PDIC 10 is mounted and fixed accurately to the housing 50. The epoxy adhesive 91, 92, 93 has low contractility and excellent heat resistance. Since the epoxy adhesive 91, 92, 93 has low contractility, the plate 20 with the PDIC 10 is mounted highly accurately to the housing 50.

Since the epoxy adhesive 91, 92, 93 has excellent heat resistance, for example, when the housing 50 of the optical pickup apparatus 1 is at a high temperature, the adhesive 91, 92, 93 is prevented from changing in quality considerably under the influence of heat. If the optical pickup apparatus 1 is at a high temperature, the plate 20 with the PDIC 10 continues to be mounted accurately and reliably on the housing 50 with the epoxy adhesives 91, 92, 93. After curing, the epoxy adhesive 91, 92, 93 becomes relatively firm.

The ultraviolet curing adhesive is one of light curing adhesives and includes adhesives with the trade name of "OPTOCAST" series available from EMI of the United States, for example. Specific ultraviolet curing adhesives include OPTOCAST 3400, OPTOCAST 3415, etc., available from EMI of the United States. The ultraviolet curing adhesives such as OPTOCAST 3400 and OPTOCAST 3415 are the epoxy type and are a one-component ultraviolet curing adhesive. The epoxy ultraviolet curing adhesives have low contractility and high heat resistance and have excellent chemical resistance and moisture resistance. Since the one-component ultraviolet curing adhesive is used, the liquid mixing operation is not needed which is performed when a two-component ultraviolet curing adhesive is used. Therefore, the application of the adhesive is performed quickly and efficiently.

The ultraviolet curing adhesive, i.e., one of light curing adhesives includes optical UV adhesives NOA 60, NOA 83H, etc., available from NORLAND of the United States, for example. The ultraviolet curing adhesives such as the optical UV adhesives NOA 60, NOA 83H, etc., are of an acrylic type and are a one-component ultraviolet curing adhesive. The acrylic ultraviolet curing adhesives have short curing time and can be cured in several seconds. "UV" means "ultraviolet". "Ultraviolet radiation" means "ultraviolet". The ultraviolet curing adhesives are referred to as UV curing adhesives, etc. According to some design specifications of the optical pickup apparatus, for example, the two-component ultraviolet curing adhesives can be used to perform the bonding step. The two-component ultraviolet curing adhesives include a two-component epoxy ultraviolet curing adhesive, for example.

Description will be made of a step of mounting the PDIC 10 to the housing 50. First, the light path position adjustment is performed for the PDIC 10. The X-axis of the PDIC 10, the Y-axis of the PDIC 10, and the Z-axis of the PDIC 10 are adjusted relative to a light path (not shown) formed in the housing 50. After the attachment position of the PDIC 10 is adjusted relative to the housing 50, the epoxy ultraviolet curing adhesives 91, 92, 93 for fixing are applied so as to bridge between the plate 20 mounted with the PDIC 10 and the displacement preventers 80A, 80B of the housing 50. The epoxy ultraviolet curing adhesives 91, 92, 93 are irradiated by ultraviolet to cure the epoxy ultraviolet curing adhesives 91, 92, 93. In this way, the plate 20 with the PDIC 10 is fixed to the housing 50.

The optical pickup apparatus 1 is a small and thin apparatus that can be mounted on an optical disk apparatus (not shown) of a portable computer.

If the optical disk apparatus is mounted with the small and thin optical pickup apparatus 1 that operates steadily, this configuration prevents the occurrence of the problem that the optical pickup apparatus 1 malfunctions in the optical disk apparatus for the portable computer and that the portable computer does not operate normally. The portable computer includes a laptop computer (not shown) and a notebook computer (not shown), for example.

Computers will be described. A personal computer is abbreviated by "PC". PASO-CON is also used as an abbreviation of a personal computer.

A desktop computer is a computer that can be used on a desk. However, the desktop computer is a computer that is not of the portable type.

As compared to the desktop PC, since the laptop PC and the notebook PC are required to be light and thin, the laptop PC and the notebook PC include an optical disk apparatus that is a slim type drive. The laptop PC and the notebook PC have configurations different from that of the desktop PC. The laptop PC or the notebook PC has an integral configuration of a display (not shown) and a PC main body (not shown). The display is folded toward the PC main body and the laptop PC or the notebook PC becomes a thin size one. When folded and viewed from above, the notebook PC is a general-purpose PC of an approximate A-4 size or smaller. Therefore, the notebook PC is also referred to as a book PC. As such, the notebook PC or the laptop PC is compact and is the portable type.

The computer in a portable form such as the laptop computer or notebook computer is increasingly being miniaturized, thinned, and lightened, and correspondingly, the optical pickup apparatus 1 is also increasingly being miniaturized, thinned, and lightened.

For example, when the portable computer is moved, if intense vibrations are applied to the computer, the present invention prevents the occurrence of the problem that the plate 20 with the PDIC 10 is displaced relative to the housing 50 of the optical pickup apparatus 1 and that the optical pickup apparatus 1 does not operate normally. The plate 20 with the PDIC 10 continues to be fixed on the housing 50 by the adhesives 91, 92, 93 fixed firmly to the displacement preventers 80A, 80B of the housing 50.

Therefore, the users of the optical pickup apparatus 1, the assembling manufacturers of the optical disk apparatus with the optical pickup apparatus 1, etc., can be provided with the small and thin optical pickup apparatus 1 that operates stably without generating the displacement of the plate 20 with the PDIC 10 under severe usage/environment where intense vibrations are applied.

The optical pickup apparatus 1 can be mounted on an optical disk apparatus used only for reading data from "CD-ROM", "DVD-ROM", etc., for example. A tilt adjustment circuit for optical disk apparatuses can be mounted on the optical disk apparatus for the read only optical disk such as "CD-ROM" or "DVD-ROM", the recordable optical disk such as "CD-R", "DVD-R", or "DVD+R", the writable/erasable or rewritable optical disk such as "CD-RW", "DVD-RW", "DVD+RW", "DVD-RAM", "HD DVD", or "Blu ray Disc", etc.

The optical disk apparatus including the optical pickup apparatus 1 can be mounted on, for example, computers such as notebook PCs, laptop PCs, and desktop PCs, audio equipments such as CD players, audio/video equipments such as DVD players, etc. The optical disk apparatus can deal with a plurality of media such as CD-type disks and DVD-type disks. The present invention is not limited to those shown in the figures. The above description is for the purpose of facilitating the understanding of the present invention and is not intended to limit the present invention. The present invention may be changed and altered without departing from the spirit thereof.

What is claimed is:

1. An optical pickup apparatus comprising:
   a photo detector configured to receive laser light reflected from a medium;
   a fixing plate mounted with the photo detector;
   a housing mounted with the fixing plate mounted with the photo detector;
   one or more projecting portions projecting from the housing, the projecting portions preventing displacement of the fixing plate relative to the housing, and each including
      one or more first grooves formed to primarily extend along a first direction that is aligned with a light axis direction of the laser light,
      one or more second grooves formed to primarily extend along a second direction that is aligned approximately orthogonal to the first direction, and
      a first separating portion separating the first grooves from the second grooves; and
   an adhesive adhering the fixing plate to the projecting portion, the adhesive being solidified in the first grooves and the second grooves.

2. The optical pickup apparatus of claim 1, wherein the adhesive comprises an ultraviolet curing adhesive that is cured when irradiated by ultraviolet light.

3. The optical pickup apparatus of claim 1, wherein the adhesive comprises an epoxy adhesive.

4. The optical pickup apparatus of claim 1, wherein the optical pickup apparatus is mounted on an optical disk apparatus of a portable computer.

5. The optical pickup apparatus of claim 1, wherein the one or more first grooves comprise a plurality of first grooves.

6. The optical pickup apparatus of claim 1, wherein the one or more second grooves comprise a plurality of second grooves.

7. The optical pickup apparatus of claim 1, wherein:
   the projecting portion includes:
      one or more third grooves formed to primarily extend along a third direction approximately orthogonal to the first direction and to the second direction, and a second separating portion separating the first grooves from the third grooves, and the adhesive is solidified in the third grooves.

8. The optical pickup apparatus of claim 7, wherein the one or more third grooves comprise a plurality of third grooves.

9. The optical pickup apparatus of claim 7, wherein the third grooves are curved.

10. The optical pickup apparatus of claim 1, wherein the one or more projecting portions includes a pair of projecting portions each disposed on opposite sides of the fixing plate, and each aligned along the second direction.

* * * * *

UNITED STATES PATENT AND TRADEMARK OFFICE
CERTIFICATE OF CORRECTION

PATENT NO. : 7,665,101 B2 Page 1 of 1
APPLICATION NO. : 11/424786
DATED : February 16, 2010
INVENTOR(S) : Yoshinaga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Twenty-eighth Day of December, 2010

David J. Kappos
*Director of the United States Patent and Trademark Office*